United States Patent [19]

Nakamura

[11] Patent Number: 5,084,127
[45] Date of Patent: Jan. 28, 1992

[54] AUTOMATIC LABEL ATTACHING APPARATUS FOR MAGNETIC DISK

[75] Inventor: Yoshiyuki Nakamura, Shiojiri, Japan

[73] Assignee: Kabushiki Kaisha Graphico, Tokyo, Japan

[21] Appl. No.: 672,056

[22] Filed: Mar. 12, 1991

Related U.S. Application Data

[63] Continuation of Ser. No. 578,090, Sep. 5, 1990, abandoned.

[51] Int. Cl.⁵ ............................................. B65C 1/00
[52] U.S. Cl. ................................... 156/475; 156/483; 156/542; 156/556; 53/586; 53/136.1
[58] Field of Search ................. 156/478–480, 156/483–486, 492; 53/137, 209, 225, 580, 586

[56] References Cited

U.S. PATENT DOCUMENTS

| | | | |
|---|---|---|---|
| 990,532 | 4/1911 | Fischer | 53/586 |
| 1,234,722 | 7/1917 | Bracy | 53/137 |
| 1,698,585 | 1/1929 | Fischer | 53/137 |
| 2,064,658 | 12/1936 | Grieb et al. | 156/486 |
| 3,535,189 | 10/1970 | Hall et al. | 156/479 |
| 4,198,258 | 4/1980 | Glösmann | 156/484 |
| 4,473,429 | 9/1984 | Crankshaw | 156/483 |
| 4,840,007 | 6/1989 | Focke et al. | 53/137 |

Primary Examiner—David A. Simmons
Assistant Examiner—Jeffrey G. Payne
Attorney, Agent, or Firm—Emmanuel J. Lobato; Robert E. Burns

[57] ABSTRACT

A 3.5-in. disk case is stored into a rotary holding frame through transfer means having a group of rollers, the intermediate portion of a printed label is stuck to the upper end surface of the disk while the holding frame is brought upright from the horizontal state, and the label is brought into pressure contact with, and automatically attached to, both surfaces of the disk when the holding frame is returned to the horizontal position and the disk is passed through the transfer means in the opposite direction.

6 Claims, 4 Drawing Sheets

AUTOMATIC LABEL ATTACHING APPARATUS FOR MAGNETIC DISK

This is a continuation of application Ser. No. 578,090, filed Sept. 5, 1990, now abandoned.

BACKGROUND OF THE INVENTION

1. Field of the Invention

This invention relates to an apparatus for attaching automatically labels onto both front and rear surfaces of a hard case for a 3.5-in. disk or the like in one process and to an apparatus for attaching automatically printed labels identifying the recorded data of a disk to the disk while keeping correct correlation between them.

2. Description of the Prior Art

A label printing press (labeller) for printing directly on a label sheet attached to a peel sheet (board) (silicon coated) in such a manner as to be peelable easily, by a thermosensitive printer or the like and transferring the board at a speed of about 100 mm/sec is well known in the art.

On a hard case of a 3.5-in. disk (hereinafter referred to simply as the "disk"), a label attaching surface(s) is specified and moreover, so-called "turn-up attaching" which turns up the edge of the label is necessary. Therefore, attaching of the printed label to the disk has been carried out manually up to the present.

In the present method of attaching work, the recording operation to the disk and label printing are carried out separately without any association between them. For this reason, a mistake where a label indicating information which does not identify the recorded data of the disk is attached is likely to occur during the label attaching operation.

SUMMARY OF THE INVENTION

The present invention provides an apparatus which accurately positions and attaches printed labels attached to a board to predetermined positions on both front and rear surfaces of the case.

In order to eliminate the discordance between the recorded data of the disk and the label indication, the present invention controls a copying apparatus as a production apparatus of the magnetic disks and a label printer by a common controller so that the printing information corresponding to the recording information of the disk can be supplied to the label printer, printing is then made and the printed information is immediately attached automatically to the case.

The apparatus of the present invention comprises means disposed in the proximity of the peeling device of a commercially available label printer, for sucking and holding part of a peeled label and pushing it down and attaching it; transfer-push means for transferring a case horizontally by a plurality of idle rollers and feed rollers rotating in both normal and reverse directions as case feeding/label attaching means, and for attaching the labels onto both surfaces at the time of reverse rotation, a case rotary holding frame for accepting the case from the transfer-push means and holding upright the edge surface of the case immediately below the label attaching means, and transmission driving means for moving the case holding frame, and the present apparatus can automatically make turn-up attaching of the printed labels to the predetermined positions of the hard case.

In the apparatus of the present invention, the driving timing at which the case upright rotary holding means is returned from the upright state to the horizontal state and the restart timing of a peel (mold release)sheet are important.

In order to reliably make turn-up attaching of the label, a first roller of the idle rollers constituting the transfer-push means is formed as a flat roller, a second roller is formed as a taper roller having a medium height and these first and second rollers are made to be non-driven rollers.

In order to eliminate the discordance between the recorded data of the disk and the printed data of the label, the apparatus of the present invention controls the copying operation of the disk and the label printer by a common controller and supplies the disk to the automatic label molding device by the disk transfer means of the copying apparatus.

The above and other objects and novel features of the present invention will become more apparent from the following description when taken in conjunction with the accompanying drawings.

DESCRIPTION OF THE PREFERRED EMBODIMENTS

Figure 1:
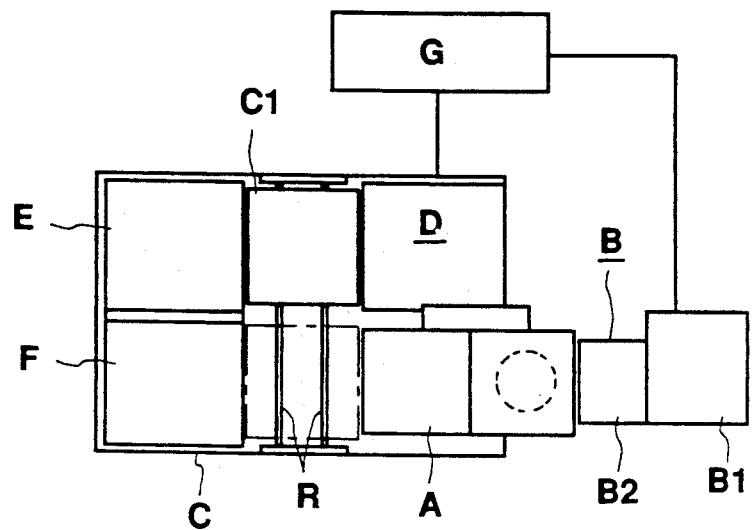
FIG. 1 is a plan view of the apparatus of the present invention as a whole.
Figure 4:
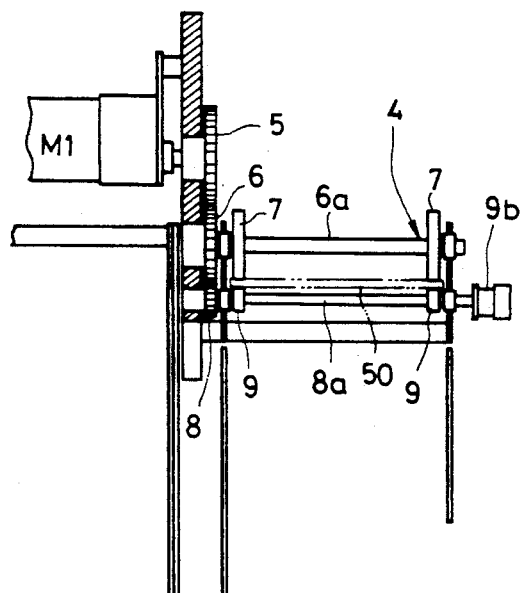
FIG. 4 is a side view of the principal portions of the driving system of a feeder.

In FIG. 1, symbol A represents a label attaching apparatus; B is a label printer; B1 is a printer portion; B2 is a peel portion; C is a copying apparatus; and C1 is a disk conveyor device which reciprocates on guide rails R and is equipped with a disk delivery-acceptance device. Symbol D represents a driver for reading/writing the disk; E is a disk hopper; F is a stacker for storing the disks to which the label is attached and G is a controller for managing the copying apparatus C and the printer B.

Figure 2:
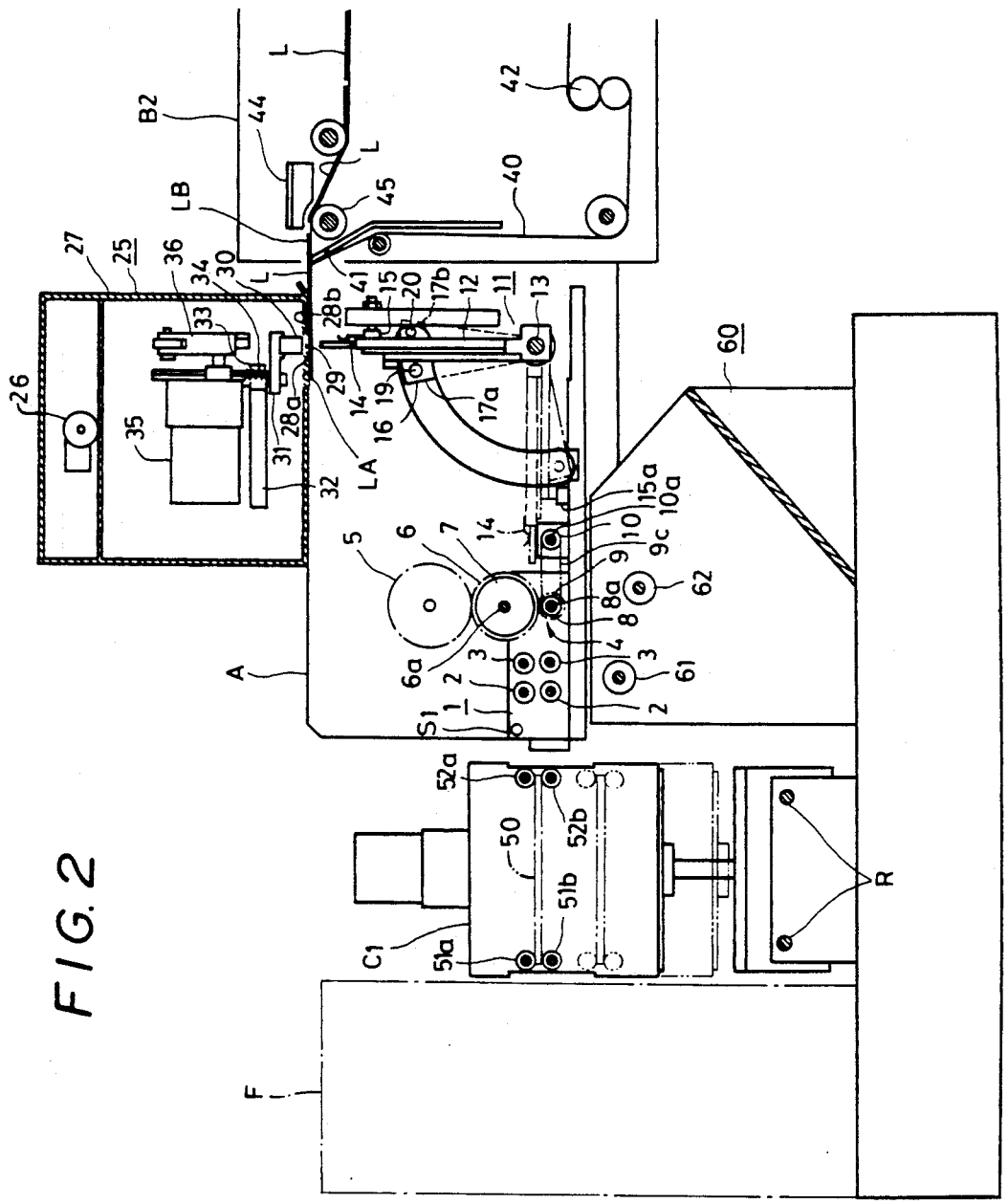
FIG. 2 is a sectional view of the principal portions of the label attaching apparatus of the present invention and part each of a label printing press (labeller) and copying apparatus adjacent to the label attaching apparatus.
Figure 3:
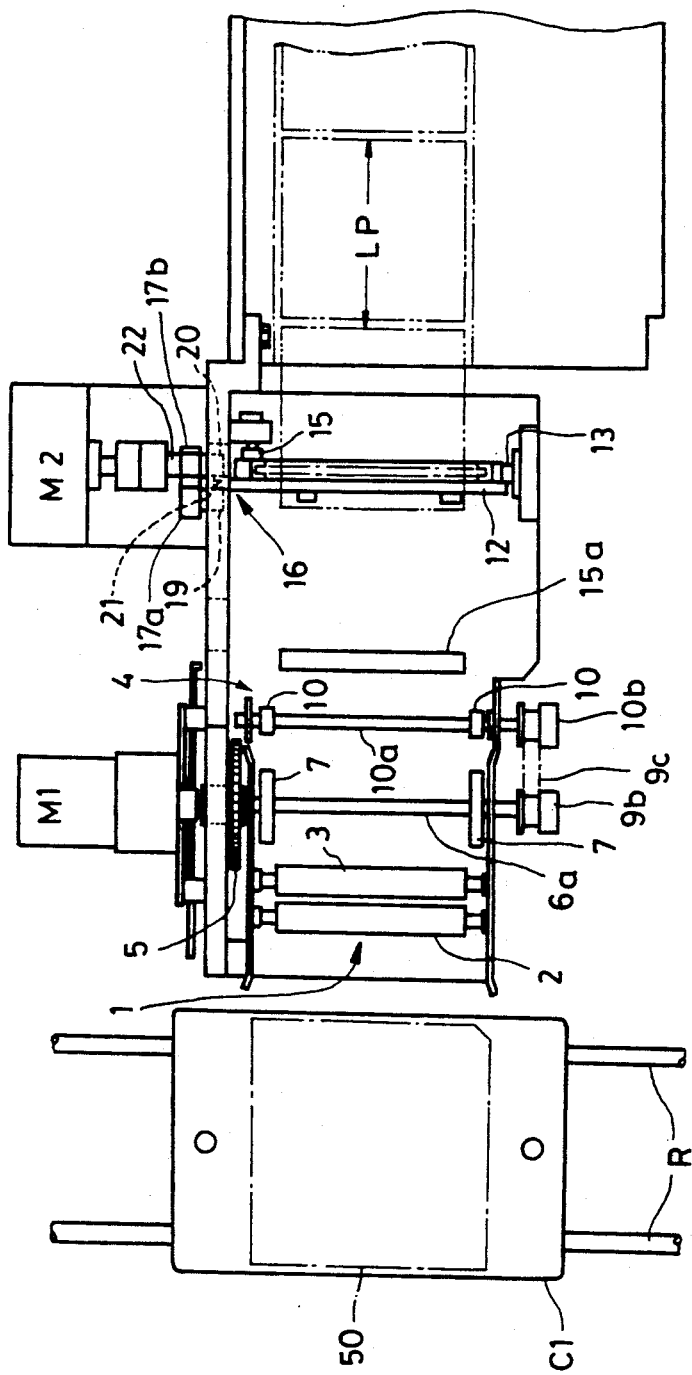
FIG. 3 is a plan view.

In FIGS. 2 and 3, reference numeral 1 represents a disk transfer-push device; 2 is a first idle roller equipped with a pair of upper and lower straight rollers; and 3 is a second idle roller consisting of a pair of upper and lower taper rollers having a medium height. Reference numeral 4 represents a feeder, wherein an intermediate gear 6 meshing with a gear 5 driven by a motor M1 and a pinion 8 meshing with this intermediate gear 6 are disposed in a longitudinal line, a feed roller 7 having a large diameter is axially fitted to the intermediate gear shaft 6a and a feed roller 9 having a small diameter is axially fitted to the pinion shaft 8a in such a manner as to oppose the feed roller 7.

Reference numeral 10 represents a follower feed roller and a pulley 10b is axially fitted to the extension portion of its roller shaft 10a outside the machine frame and is connected to another pulley 9b fitted to the extension portion of the pinion shaft 8a through a belt or a chain 9c.

Reference numeral 11 represents an upright rotation holding device, and a holding frame 12 for receiving the disks via the open end and holding them rotates with a pivot shaft 13 on the base end side being the center and keeps two states, that is, the horizontal state and vertical state.

Reference numeral 14 represents a leaf spring or roller for backup which comes into contact with one of the surfaces of the disk, reference numeral 15 represents a vertical stopper of the holding frame 12 and 15a represents a horizontal stopper.

Figure 5:
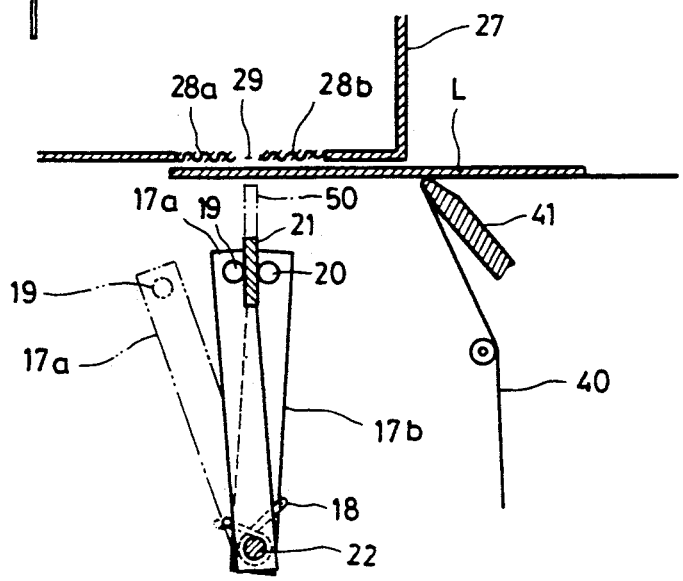
FIG. 5 is a partial enlarged view of a pinch arm and a label suction device.

Reference numeral 16 represents a transmission device for moving the holding frame. As shown in FIGS. 3 and 5, a first pinch arm 17a fitted to the driving shaft 22 of the reduction motor M2 disposed on the same axis as the pivotal shaft 13 and a second pinch arm 17b fitted idly to this shaft clamp the side protuberance 21 of the holding frame through their pinch plates 19, 20 and rotate the holding frame 12.

The pair of pinch arms 17a and 17b are biased in the mutually contacting direction by a weak torsion spring 18.

Reference numeral 25 represents a label suction and attaching device. Suction portions 28a, 28b consisting of a perforated plate and a window 29 are disposed on the bottom of a box 27 incorporating therein a blower 26 in this device 25. The window 29 is disposed immediately above the implanted rotary holding frame 12 and a rubber push plate 30 is put into this window in such a manner as to be capable of moving up and down.

Reference numeral 31 represents a movable plate which holds the push plate and moves up and down with respect to a base 32; 33 is a guide post; and 34 is a return spring.

The movable plate 31 is pushed down by a rotary cam 36 coupled directly to a motor 35 and thus the push plate 30 pushes down the label through the window 29.

The label peel portion B2 of the printer is equipped with a knife edge 41 for bending a board 40 at an acute angle and this knife edge 41 is positioned substantially on the same level as the bottom of the box 27 of the label suction device Reference numeral 42 represents a driving roller of the label board, which is driven by the printing control output of the label printer with a label pitch LP being its unit driving length.

Reference numeral 44 represents a printer which is controlled by a controller G and reference numeral 45 represents a guide roller.

Next, the function of the apparatus described above will be explained.

It will be assumed hereby that the disk case 50 is supplied from the disk conveyor device C which reciprocates between the disk driving device D and the label attaching apparatus A.

When the disk 50 is supplied by the normal-reverse rotation feed rollers 51a, 51b, 52a, 52b of the disk delivery device mounted to the disk conveyor device to the transfer-push device 1, the motor M1 is started by the output of the sensor S1 to rotate the feed rollers 7, 9 and the follower roller 10 and insert the disk 50 into the holding frame 12 which is under the horizontal state.

On the other hand, the label L is under the stand-by state while its leading portion LA is being sucked and held by the suction portion 28 with its trailing portion LB being left on the board.

The motor M2 for rotating the pinch arms 17a, 17b is actuated by a disk loading signal, erects and then stops the holding frame 12. Then, the motor 35 of the label putting device rotates by a predetermined angle of rotation and lowers and then returns the push plate 30 to the predetermined position.

The label under the stand-by state is pushed down by the descending push plate 30 and the tacky surface at the folding center on the back of the label L is stuck to the disk end surface.

Then, the motor M2 rotates reversely and turns counterclockwise the pinch arm 17a.

In this instance, in order to ensure the end surface attaching by the label(excessive force must not be applied to the label), the rotating speed of the holding frame 12 and the driving speed of the label board 40 must be brought into accurate conformity with each other. (but this is extremely difficult to attain by use of simple control means).

Therefore, it is necessary to prevent the holding frame from being rotated forcedly even when the pinch arm 17a rotates.

Since the pinch arm 17a is pivotally fitted to the rotary shaft 22, it rotates in synchronism with the motor M2 but the holding frame 12 is not immediately rotated because the force of rotation is transmitted through the weak torsion spring 18. When driving of the board 40 is thereafter started a little later, the tensile resistance to the holding frame 12 is released, so that the torsion spring 18 acts and both pinch arms returns the holding frame to the horizontal state in cooperation with each other. Accordingly, the remaining portion of the label can be peeled safely from the board without peeling the portion of the label that is attached to the disk end surface.

The disk 50 is rotated with the holding frame 12 under the state (FIG. 6A) where the label is attached in the T form to the rear end surface of the disk 50. When the holding frame reaches the horizontal state, the motor M1 is reversely driven and the disk is transferred between the feed rollers 7 and 9 by the rotation of the follower feed roller 10.

At this time, the minor side portions (lower portions) and major side portions (upper portions) of the label come into contact with the rotary shafts 9a and 6a, respectively, are deformed preparatively (FIG. 6B) and are then fed between the second rollers 3 and 3 of transfer-push device.

Figure 6:
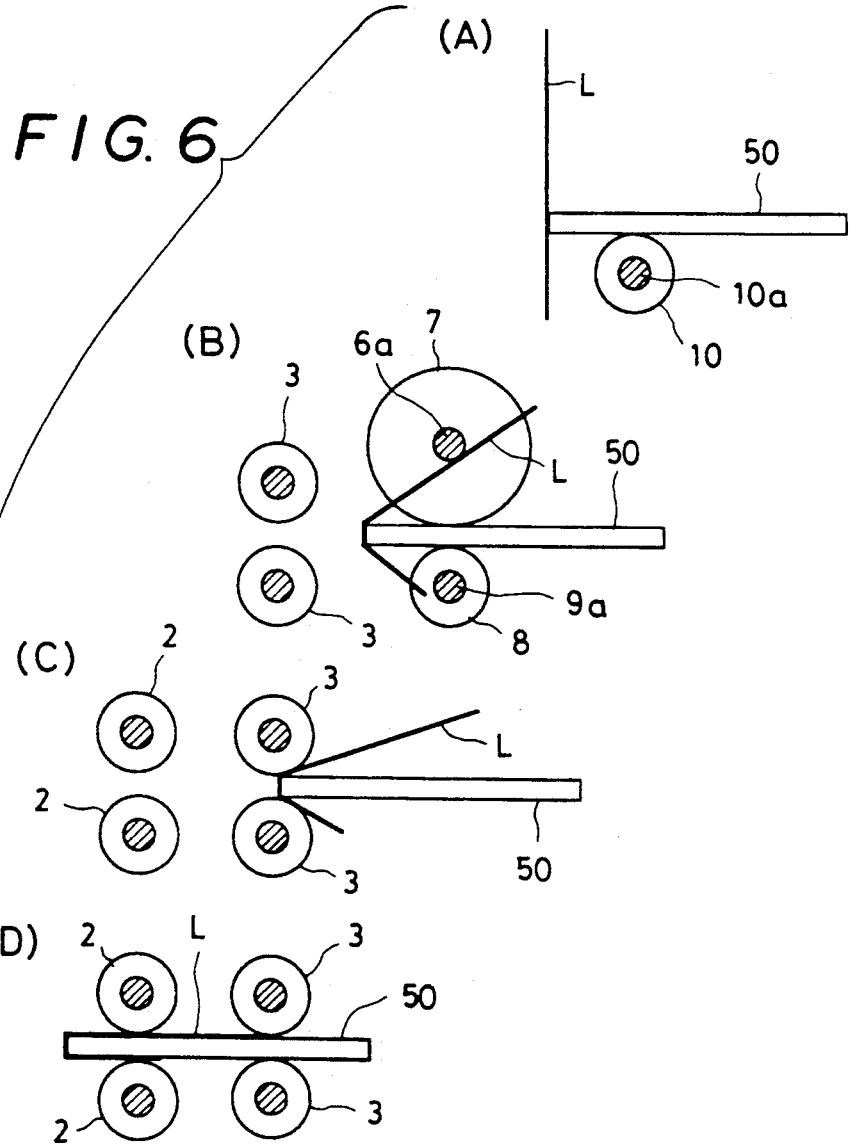
FIG. 6 is an explanatory view showing the bending and attaching process of the label to be attached.

Since the pair of second pollers 3, 3 have the taper form of a medium height made of flexible material, the label is pressed strongly from its center portion and is sent between the first rollers 2 and 2 while the air is being removed (FIG. 6C).

The first rollers are flat rollers made of a highly flexible material and attaching is completed while they strongly press the entire surface of the label (FIG. 6D).

After passing through the first rollers, the disk is detected by the sensor and the feed rollers 52a, 52b and rollers 51a, 51b of the disk conveyor device are rotated reversely, so that the disk is fed into the stacker F and is completely pushed in by a push device not shown in the drawing.

During the label attaching operation, the disk conveyor device C1 receives a new disk from the disk feed hopper and supplies it to the driver D. Therefore, after the case is fed into the stacker F, the disk conveyor device moves towards the driver D side, receives the recorded disk from the driver and supplies it to the label attaching machine.

Incidentally, when any disk having defective writing is found in the disk driver D, the conveyor device lowers on receiving the instruction from the controller (to the position represented by chain line in FIG. 2) and discharges the defective disk to a discharge portion 60.

Reference numerals 61 and 62 represents discharge-guide rollers.

In accordance with the apparatus of the present invention, the label attching work to both surfaces of the hard case, that has been carried out mannually in the past, can be conducted fully automatically and when used while connected with a commercially available label printer and a disk copying apparatus, the present apparatus can attach the printed label carrying information correctly identifying the recorded data to both surfaces of the disk.

What is claimed is:

1. An automatic label attaching apparatus for attaching labels to magnetic disk cases and the like comprising:
    means disposed in use in the proximity of a label peeling device of a label printer for applying a suction onto and holding a leading end portion of individual successively peeled labels received successively from said peeling device and having push-means for pushing downwardly individually the leading end portion of said peeled labels,
    transfer means having a plurality of paired idle and driven rollers rotated in a direction for transferring successively individual disk cases onto which labels are to be attached,
    rotary means having a frame for receiving and storing temporarily the disk cases received individually from said transfer means and for positioning successively an end surface of the individual disk cases in a position immediately below said push-means for having a leading end portion of a peeled label attached thereto by said push-means with a part of the leading end portion extending laterally from said end surface,
    means for accuating said push means downwardly while individual end surfaces of the disk cases are in position successively below the push-means to effectively attach a label leading end portion on an individual end surface of the individual disk cases,
    means for driving said rotary means including means for returning of the individual disk cases back to said transfer means rollers with a leading end portion of a peeled label attached to the end surface thereof, and
    means for reversibly driving said driven rollers for driving said rollers in a direction opposite to the first-mentioned direction to pass through said paired driven end idle rollers the end surfaces of the individual disk cases successively returned to said transfer means with a label thereon onto opposite sides of the individual disk cases and attaching the peeled label to said opposite sides.

2. An automatic label attaching apparatus for attaching labels to magnetic disk cases and the like according to claim 1, in which rotary means comprises a drive transmission having a pair of pinch arms, and resilient means biasing the pinch arms toward each other with a weak force.

3. An automatic label attaching apparatus for attaching labels to magnetic disk cases and the like according to claim 1 or 2, including a conveyor for supplying said disk cases to said transfer means and a controller for controlling said conveyor synchronously with said label printer.

4. An automatic label attaching apparatus for attaching labels to magnetic disk cases according to claim 1, including means for controlling the rotary means synchronously with said peeling device.

5. An automatic label attaching apparatus for attaching labels to magnetic disk cases and the like comprising:
    means disposed in use in the proximity of a label peeling device of a label printer for applying a suction onto and holding individual successively peeled labels received successively from said peeling device and having push-means for pushing individually said peeled labels onto said disk cases individually,
    transfer means having a plurality of idle and driven rollers rotated in a direction for transferring successively individual disk cases onto which labels are to be attached,
    rotary means having a frame for receiving and storing temporarily the disk cases received individually from said transfer means and for positioning successively a surface of the individual disk cases in a position for having a peeled label attached thereto by said push-means with a portion of the peeled label extending laterally from said surface,
    means for accuating said push means while each individual said surface of the individual disk cases is in said position to effectively attach a label on said individual surface of the individual disk cases,
    means for driving said rotary means including means for returning of the individual disk cases back to said transfer means rollers with a peeled label attached to said surface thereof, and
    means for reversibly driving said driven rollers for driving said rollers in a direction opposite to the first-mentioned direction to pass through said driven end idle rollers surfaces of the individual disk cases successively returned to said transfer means with a label attached thereto into said rollers to effect pressing of the peeled label thereon onto opposite sides of the individual disk cases and attaching the peeled label to said opposite sides.

6. A method for automatically attaching labels to magnetic disk cases and the like comprising:
    releasably holding a leading end portion of individual successively peeled labels received successively from a peeling device of a label printer and subsequently pushing downwardly individually the leading end portion of said peeled labels for attaching the individual labels to individual disk cases,
    transferring along a transfer path successively individual disk cases onto which labels are to be attached by rotatably driving driven rollers in a transfer direction,
    receiving and storing temporarily the disk cases received individually from said transfer path and positioning successively an end surface of the individual disk cases in a position for having a leading end portion of a peeled label attached thereto with a part of the leading end portion extending laterally from said end surface,
    pushing downwardly successively the leading portion of the peeled labels while individual end surfaces of the disk cases are in said position to effectively attach a label leading end portion on individual end surfaces of the disk cases, returning the individual disk cases back to said transfer path with a leading end portion of a peeled label attached to the end surface thereof, and reversibly driving said driven rollers for driving said rollers in a direction opposite to the first-mentioned direction to pass the end surfaces of the individual disk cases with a label attached thereto into the driven rollers to effect pressing of the peeled label onto opposite sides of the individual disk cases and attaching the peeled label to said opposite sides.

* * * * *